United States Patent [19]

Crist

[11] E Re. 31,409

[45] Reissued Oct. 11, 1983

[54] UNIVERSAL RECESSED WALL CABINET

[76] Inventor: Norman B. Crist, 12927 NE. 151st, Kirkland, Wash. 98033

[21] Appl. No.: 124,336

[22] Filed: Feb. 25, 1980

Related U.S. Patent Documents

Reissue of:

[64] Patent No.: 4,076,350
Issued: Feb. 28, 1978
Appl. No.: 644,431
Filed: Dec. 29, 1975

[51] Int. Cl.[3] ..... A47B 67/00; A47F 5/08; G12B 9/00

[52] U.S. Cl. ..... 312/242; 312/101; 312/245; 248/27.1; 211/87

[58] Field of Search ..... 312/242, 245, 204, 224, 312/226, 249, 101; 232/43.1, 43.4; 211/87, 103; 248/27.1, DIG. 6

[56] References Cited

U.S. PATENT DOCUMENTS

| | | | |
|---|---|---|---|
| 492,443 | 2/1893 | Stewart | 312/101 |
| 1,410,378 | 3/1922 | Crossland | 312/101 |
| 1,625,011 | 4/1927 | Wolfe et al. | 312/242 |
| 1,866,649 | 7/1932 | Hale | 312/242 |
| 2,579,379 | 12/1951 | Fritsche | 232/43.4 |
| 2,826,472 | 3/1958 | Humphner | 312/101 |
| 2,915,266 | 12/1959 | Antonucci | 248/DIG. 6 |
| 3,067,822 | 12/1962 | Hattenhauer | 312/242 |
| 3,220,791 | 11/1965 | Pokryfke et al. | 312/242 |
| 3,352,428 | 11/1967 | Sak et al. | 211/87 |
| 3,620,404 | 11/1971 | Grasso | 312/242 |
| 4,024,729 | 5/1977 | Abate, Sr. et al. | 312/101 |

FOREIGN PATENT DOCUMENTS

| | | | |
|---|---|---|---|
| 1139968 | 11/1962 | Fed. Rep. of Germany | 312/242 |

*Primary Examiner*—Victor N. Sakran
*Attorney, Agent, or Firm*—Robert W. Beach; Douglas E. Winters; Ward Brown

[57] ABSTRACT

A rectangular mounting frame of angle cross section encircling a case receivable at least partially within the opening of a wall includes an outer flange portion projecting perpendicularly from the case sidewalls closely overlying the margin of the wall opening and an inner flange portion slidable relative to the case sidewalls interposed between such sidewalls and the wall structure within the wall opening. Screws extend from the inside of the case through the case sidewalls and the inner flange portion of the mounting frame and are screwed into the wall structure within the wall recess.

2 Claims, 6 Drawing Figures

Fig. 1.
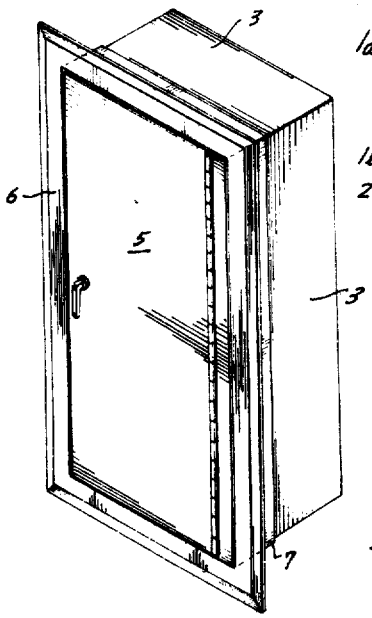
Fig. 2.
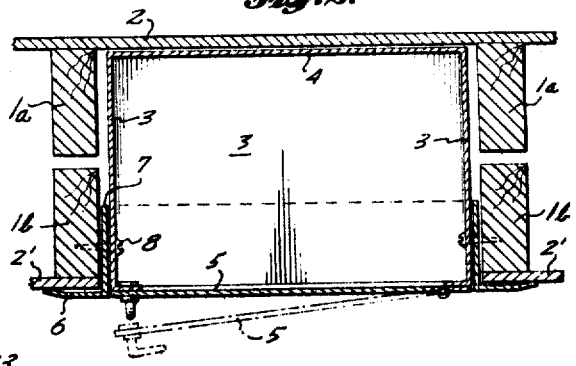
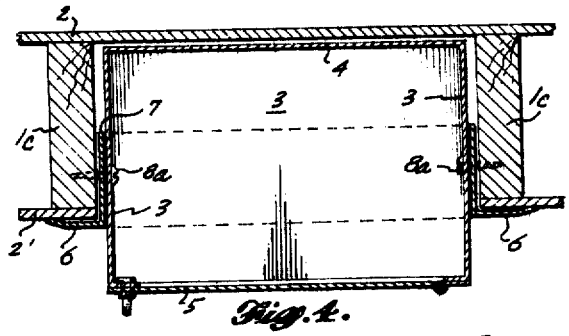
Fig. 4.
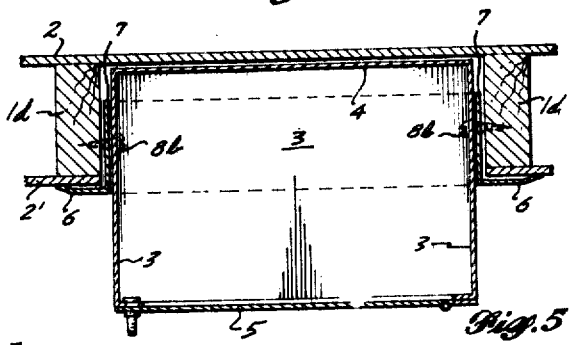
Fig. 5
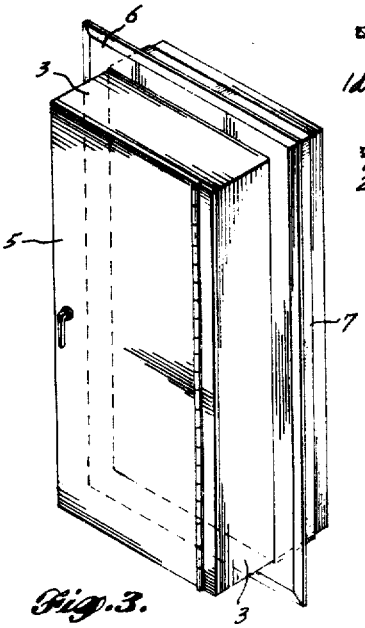
Fig. 3.
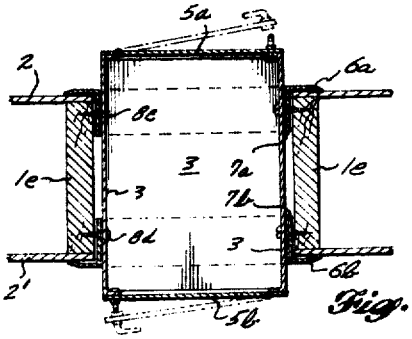
Fig. 6.

UNIVERSAL RECESSED WALL CABINET

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to [a cabinet for] mounting [on] *a cabinet or case in* a wall *recess or opening* with at least a portion of the cabinet recessed in [a] *the* wall structure and, preferably, with as much of the cabinet *or case* as possible received within the wall recess *or opening*.

2. Prior Art

Cabinets *or cases*, such as [for] mail boxes, waste receptacles and [housing] fire [extinguishers] *extinguisher cabinets*, for example, have been of the surface-mounted type in which the cabinet is mounted on the outer surface of a wall, the partially-recessed type, or the fully-recessed, flush-mounted type where the cabinet is received within a wall recess sufficiently deep so that the front of the cabinet *or case* is substantially flush with the wall surface. It is undesirable to mount a cabinet on the surface of the wall because it projects an undesirably great distance outward from the wall surface, and it is preferred to recess the cabinet as much as possible. To provide a selection of cabinets for installation in walls of different thicknesses requires the availability of a considerable inventory of cabinets.

SUMMARY OF THE INVENTION

It is a principal object of the present invention to provide a wall cabinet of standard depth which can be installed in walls of different thickness in a condition recessed as far as possible into the wall if the wall is not thick enough to receive the full depth of the cabinet.

Another object is to provide a practical and economical selective mounting arrangement for a case to adapt a single type of cabinet for mounting conveniently in wall structures of different thicknesses.

*A further object is to provide a mounting frame for a case which can be slidably adjustable relative to the case.*

The foregoing objects can be accomplished by providing a mounting frame securable to the sidewalls of a case in various selected positions spaced different distances from [the back wall] *an open side* of the case.

BRIEF DESCRIPTION OF THE DRAWINGS

FIG. 1 is a top perspective of an unmounted cabinet adapted for flush mounting.

FIG. 2 is a horizontal section through the cabinet of FIG. 1 in a flush-mounted installation.

FIG. 3 is a top perspective of a cabinet adapted for partially-recessed mounting.

FIGS. 4 and 5 are horizontal sections through installations of cabinets such as shown in FIG. 3 in partially recessed positions.

FIG. 6 is a horizontal section through a modified type of cabinet shown in wall-mounted condition.

DETAILED DESCRIPTION

It is desirable to install [cabinets for] mail boxes, fire [extinguishers] *extinguisher cabinets* and trash receptacles, for example, in readily accessible places in buildings. It is convenient and customary to install such

[cabinets] *cases* on walls such as in halls or outer offices. It is undesirable to have such a [cabinet] *case* project outwardly from the wall on which it is mounted because halls generally are narrow, and it is undesirable to have objects projecting into them. Cabinets for fire extinguishers must be sufficiently deep, however, to accommodate fire extinguishers of adequate size. Frequently, walls are not sufficiently deep to accommodate the installation of such a cabinet flush-mounted, and, consequently, the cabinet is mounted on the outer surface of the wall, or recessed to some degree but not necessarily to the maximum degree.

*The present invention relates to mounting in a recess or aperture of a wall structure a device having a case with sidewalls arranged orthoginally and of a depth greater than the width of a rectangular mounting frame snugly encircling and fitting slidably around the case sidewalls. Such frame is installed in a wall recess or aperture to receive the case within it.*

A wall structure suitable for receiving a particular cabinet as a flush-mounted installation is shown in FIG. 2 as including 2×4 inch studs 1a [is] *in* spaced parallel relationship on which a wall surface member 2 is mounted. Additional studs 1b are mounted in registration, respectively, with studs 1a on which the opposite wall surface member 2' is mounted. The studs 1a and 1b are spaced apart along the wall a distance slightly greater than the horizontal width of the cabinet case to be mounted in the wall recess formed between one set of studs 1a and 1b and the other set of studs 1a and 1b.

The cabinet includes a standard case having sidewalls *3* having forward coplanar edges forming a front opening [3] which include top, bottom and sides, a back wall 4 fixedly connected to the [rearwood] *rearward* portions of the sidewalls 3 and a front wall cover 5 for closing the front opening. In order to provide as much access as possible to the interior of the cabinet, most of such front wall is in the form of a door. The cabinet is completed by a rectangular mounting frame encircling the case. Such mounting frame is composed of four border members arranged orthoginally, each of angle cross section, including an outer flange portion 6 projecting substantially perpendicular outwardly from the sidewalls 3 of the case, and an inner flange portion 7 disposed substantially parallel to the case sidewalls, snugly fitting slidably alongside such sidewalls and interposed between the case sidewalls and the recess *or aperture* in the building wall structure defined by the studs 1a and 1b. The depth of the frame perpendicular to the flange 6 is substantially less than the depth of the case sidewalls 3.

In the flush-mounted cabinet installation shown in FIG. 2, the inner flange portion 7 of the mounting frame is positioned relative to the sidewalls 3 of the case so that the outer flange portion 6 will be flush with the *front opening or* outer wall 5 of the case. Registering holes are provided in the inner flange 7 and in the case sidewalls 3 to receive anchoring pins such as wood screws 8 extending through such holes from the interior of the case. When the cabinet has been placed in the wall recess with the outer flange portions 6 overlying the margin of the wall surface aperture through which the recess opens, as shown in FIG. 2 the wood screws 8 can be driven through the registering apertures in the inner flange portions 7 and the sidewalls 3 of the case and extend into the wall structure formed by the studs 1b. The [cabinet] *case* will be anchored in place solely by such screws in flush-mounted position with the screws 8 being accessible only from within the [cabinet] *case*.

In FIG. 4, the cabinet is shown installed in partially recessed condition in a recess of a wall which is not as thick as the depth of the cabinet case. Such wall is constructed with studs 1c which may be about 2×6 inch dimension spaced apart along the wall a distance to receive the cabinet case snugly between them. The back wall surface member 2 is mounted on one set of corresponding edges of studs 1c, and the apertured front wall surface member 2' is mounted on the other set of corresponding edges of the studs.

In this instance, the mounting frame 6, 7 is of the same type as used for the flush-mounted cabinet installation of FIG. 2 because the depth of the frame flange 7 is substantially less than the depth of the case sidewalls 3. The mounting frame inner flange portions 7 are slid rearwardly along the sidewalls 3 of the case a distance sufficient to enable the outer flange portions 6 to overlie closely the margin of the opening in wall surface member 2' when the rear wall 4 of the case is located closely adjacent to the inner side of the wall surface member 2, as shown in FIG. 4. Registering holes are then provided through the inner flange portions 7 of the mounting frame and the sidewalls 3 of the [cabinet] case to receive anchoring screws 8a.

When the case has been set into the wall recess substantially as far as possible depending on the thickness of the wall, as shown in FIG. 4, screws 8a are driven through the registering holes provided in the case sidewalls and the inner flange portions 7 of the mounting frame into the wall structure within the recess formed by the wall studs 1c. In this instance also the [cabinet] *case* is thus anchored in the wall recess with the anchoring screws 8a accessible only from the interior of the case. The cabinet will thus be installed in partially-recessed condition with as much of the case depth as possible received in the recess and the remainder of the case depth projecting out of the recess beyond the outer face of the outer flange portions 6.

In FIG. 5, the same cabinet is shown as being installed in another partially-recessed condition in the recess of a wall which is thinner than the wall of FIG. 4. In this instance, the wall structure includes studs 1d spaced apart lengthwise of the wall which may be 2×4 inches. Again, a back wall surface member 2 is mounted on one set of corresponding edges of such wall studs and an apertured front wall surface member 2' is mounted on the other set of corresponding edges of the studs. In this instance, the same type of mounting frame 6, 7 is slid farther inward along the case sidewalls 3 toward the case back wall 4 to a position such that, when the flange portions 6 are disposed closely overlying the margin of the access opening to the wall recess, the back wall 4 of the case will be located closely adjacent to the inner side of the back wall surface member 2, as shown in FIG. 5. Even in this instance the back 4 of the case is located rearwardly of the rearward edge of flange 7 because the depth of the frame is so much less than the depth of the case sidewalls 3.

For a cabinet installation of the type shown in FIG. 5, registering holes will be provided in the case sidewalls 3 and in the inner flange portions 7 of the mounting frame for receiving anchoring screws 8b. When the cabinet has been placed with its inner portion in the wall recess, as shown in FIG. 5, screws 8b are driven through such registering holes into the wall structure of the recess in the form of the studs 1d. In this instance also the anchoring screws will be accessible only from the interior of the case. Again, as much as possible of the depth of the case is received in the wall aperture and the remainder of the case depth projects outward beyond the outer flange portions 6 of the frame. It will be evident that the same case and the same mounting flange can be used for installation in walls of different thickness where the [cabinet] *case* front projects different distances corrresponding to the particular wall thickness.

In the cabinet installation of FIG. 6, the case is deeper than the case shown in FIGS. 1 to 5, inclusive. In this instance, the end walls 5a and 5b closing the edges of the sidewalls 3 may both have doors in them affording access to the interior of the case from either side, respectively, of the wall on which the cabinet is mounted. The wall may be of any thickness but is illustrated as incorporating spaced studs 1e of 2×10 inch size. A wall surface member 2 is mounted on one set of corresponding edges of the studs 1e and another wall surface member 2' is mounted on the other set of corresponding edges of such studs.

Since the cabinet in the installation shown in FIG. 6 has access to the interior of the case through both ends, the case is mounted so that both of such ends are exposed through apertures in both wall surface members 2 and 2', respectively. Since the depth of the [cabinet] *case* is greater than the thickness of the wall, a portion of such [cabinet] *case* must project beyond one or the other or both of the wall surface members 2 and 2'. While the projection beyond one of such members could be different from the projection beyond the other of such members, the cabinet is shown as being installed in FIG. 6 with the projections of the [cabinet] *case* ends beyond the opposite wall surface members being substantially equal.

In order to mount the deep [cabinet] *case* shown in FIG. 6 in a through wall [recess] *aperture*, two mounting frames are provided encircling the opposite end portions of the sidewalls 3 of the [cabinet] *case*. Both of such frames are of the type shown in FIGS. 2, 4 and 5. One of these frames includes the outer flange portions 6a projecting from the case sidewalls 3 and closely overlying the margin of the aperture in wall surface member 2 and inner flange portions 7a received snugly between the case sidewalls 3 and the wall aperture. The other mounting frame includes the outwardly projecting flange portion 6b disposed in position closely overlying the margin of the aperture in wall surface member 2' providing access to the wall recess and the inner flange portions 7b fitting snugly between the sidewalls 3 of the case and the wall aperture.

Registering holes are provided in the case sidewalls 3 and the inner flange portions 7a for receiving anchoring screws 8c, and registering holes are provided in the case sidewalls 3 and the inner flange portions 7b for receiving anchoring screws 8d. When the [cabinet] *case* has been positioned in the wall [recess]*aperture* in the manner shown in FIG. 6, screws 8c are driven through the registering holes in the case sidewalls and the inner flange portions 7a and into the portion of the wall structure formed by the studs 1e to anchor one end portion of the [cabinet]*case* in the wall recess. Screws [8c] *8d* are driven through the registering holes in the case sidewalls 3 and the inner flange portions 7b and into the wall structure formed by the studs 1e to anchor similarly the opposite end portion of the cabinet.

Again it will be seen from FIG. 6 that the screws 8c and 8d are accessible only from the interior of the case. While the interior of the case is shown as being unobstructed, an upright central partition could be provided in the case so as to divide it into two compartments. In that case, the screws 8c would be accessible only from one compartment, and the screws 8d would be accessible only from the other compartment.

Because the case and mounting frame used for each of the installations shown in FIGS. 2, 4 and 5 is the same, it is not necessary to stock different cabinets *to be used for the same purpose* for these various types of installation. Also various designs of frame structure can be provided, each of which can be used for any of such installations. In each instance a line can be drawn around the case to locate the position of the mounting aperture and then the cabinet mounting aperture can be cut to size to receive the inner flange portions of the mounting frame angle cross section. The mounting frame is then inserted in the aperture and the case is inserted within the mounting frame. The composite case and mounting frame structure is then secured in the wall recess in the manner described above.

I claim:

[1. A universal recessed wall cabinet for installation in a wall structure recess comprising:

a case defining a storage compartment, said case having a substantially rectangular cross section of substantially constant area from front to back of said case, the outer periphery of said case being formed by flat sidewalls including top, bottom and sides for blocking access between said storage compartment and the wall recess, and said case top, bottom and sides having forward coplanar edges defining a planar front opening;

a rectangular mounting frame separate from said case, including four border members arranged orthogonally, each border member being of angle cross section forming an outer flange portion and an inner flange portion, said inner flange portions of said four border members being parallel to and snugly encircling said case sidewalls and said outer flange portions of said four border members projecting outward from said border member inner flange portions for engagement with an outer face of the wall structure, said inner flange portion of each border member being substantially narrower than the width of said case sidewalls, and said mounting frame and case being relatively slidable for adjustment of said mounting frame toward and away from said case front opening for engagement of said mounting frame border member outer flange portions with the outer margin of the wall structure recess when said case is installed in such recess with its sidewalls extending inwardly beyond the inner edges of said mounting frame border member inner flange portions; and securing pins of a length much greater than the combined thicknesses of said case sidewalls and said mounting frame border member inner flange portions for extending from inside said case, through said case sidewalls, through said mounting frame border member inner flange portions and penetrating into the wall structure forming the recess whereby said case and mounting frame are both secured in the wall structure recess by said securing pins.]

*2. A device for installation in a wall structure recess comprising:*

*a case having a substantially rectangular cross section of substantially constant area from front to back of said case, the outer periphery of said case being formed by flat sidewalls including top, bottom and sides for blocking access between the interior of said case and the wall recess, and said case top, bottom and sides having forward coplanar edges defining a planar front opening;*

*a rectangular mounting frame separate from said case, including four border members arranged orthogonally, each border member being of angle cross section forming an outer flange portion and an inner flange portion, said inner flange portions of said four border members being parallel to and snugly encircling said case sidewalls and said outer flange portions of said four border members projecting outward from said border member inner flange portions transversely thereof and away from the case sidewalls respectively adjacent thereto for engagement with the outer face of the wall structure encircling the recess, said inner flange portion of each border member being substantially narrower than the width of said case sidewalls and projecting from the outer flange portion joined thereto away from said case frame opening for insertion into the wall structure recess, and said mounting frame and case being fitted for relative sliding for adjustment of said mounting frame toward and away from said case front opening between a position of said mounting frame in which its outer flange portions are closer than the width of said frame inner flange portions to the case front opening, a position of said mounting frame in which its outer flange portions are substantially even with the case front opening when the case front opening is substantially flush with the outer margin of the wall recess, and positions of said mounting frame in which its outer flange portions are farther than the width of said frame inner flange portions from the case front opening with said mounting frame border member outer flange portions in engagement with the outer margin of the wall structure recess when said inner flange portions project rearward into the wall structure recess and when said case is installed in such recess with its sidewalls extending inwardly beyond the inner edges of said mounting frame border member inner flange portions; and*

*headed securing pins of a length much greater than the combined thicknesses of said case sidewalls and said mounting frame border member inner flange portions for extending from inside said case through said case sidewalls and through said mounting frame border member inner flange portions and penetrating into the wall structure forming the recess for forcing walls of said case and adjacent inner flange portions of mounting frame border members conjointly toward the wall structure within the wall structure recess whereby said case and said mounting frame are positively secured conjointly in the wall structure recess by said securing pins.*

*3. A case installation in a wall structure recess comprising:*

*a case having a substantially rectangular cross section of substantially constant area from front to back of said case, the outer periphery of said case being formed by flat sidewalls including top, bottom and sides fitting in the recess and blocking access between the interior of*

*said case and the wall recess, and said case top, bottom and sides having forward coplanar edges defining a planar front opening;*

*a rectangular mounting frame separate from said case, including four border members arranged orthogonally, each border member being of angle cross section forming an outer flange portion and an inner flange portion, said inner flange portions of said four border members being parallel to and snugly encircling said case sidewalls and said outer flange portions of said four border members projecting outward from said border member inner flange portions transversely thereof and away from the case sidewalls respectively adjacent thereto and engaged with the outer face of the wall structure encircling the recess, said inner flange portion of each border member being substantially narrower than the width of said case sidewalls and projecting from the outer flange portion joined thereto away from said case frame opening and inserted into the wall structure recess, and said mounting frame and case being fitted for relative sliding for adjustment of said mounting frame toward and away from the case front opening between a position of said mounting frame in which its outer flange portions are closer than the width of said frame inner flange portions to the case front opening, a position of said mounting frame in which its outer flange portions are substantially even with the case front opening when the case front opening is substantially flush with the outer margin of the wall recess, and positions of said mounting frame in which its outer flange portions are farther than the width of said frame inner flange portions from the case front opening and adjusted with the mounting frame closer to the case front opening than the width of said frame inner flange portions with said mounting frame border member outer flange portions in engagement with the outer margin of the wall structure recess and with said inner flange portions projecting rearward into the wall structure recess and said case sidewalls extending inwardly beyond the inner edges of said mounting frame border member inner flange portions; and*

*headed securing pins of a length much greater than the combined thicknesses of said case sidewalls and said mounting frame border member inner flange portions, extending from inside said case through said case sidewalls and through said mounting frame border member inner flange portions, penetrating into the wall structure forming the recess and forcing walls of said case and adjacent inner flange portions of said mounting frame border members conjointly toward the wall structure within the wall structure recess whereby said case and said mounting frame are positively secured conjointly in the wall structure recess by said securing pins.*

* * * * *